United States Patent [19]

Lak

[11] Patent Number: 5,398,515
[45] Date of Patent: Mar. 21, 1995

[54] FLUID MANAGEMENT SYSTEM FOR A ZERO GRAVITY CRYOGENIC STORAGE SYSTEM

[75] Inventor: Tibor I. Lak, Huntington Beach, Calif.

[73] Assignee: Rockwell International Corporation, Seal Beach, Calif.

[21] Appl. No.: 64,326

[22] Filed: May 19, 1993

[51] Int. Cl.⁶ .................................................. F17C 5/02
[52] U.S. Cl. ................................. 62/47.1; 62/48.1
[58] Field of Search ................ 62/47.1, 45.1, 48.1

[56] References Cited

U.S. PATENT DOCUMENTS

| | | | |
|---|---|---|---|
| 2,790,307 | 4/1957 | Ayres | 62/47.1 |
| 3,087,311 | 4/1963 | Rousseall | 62/47.1 |
| 3,105,361 | 10/1963 | Bell et al. | 55/160 |
| 3,191,395 | 6/1965 | Maher et al. | 62/47.1 |
| 3,393,367 | 9/1968 | DePeri | 62/45 |
| 3,473,343 | 10/1969 | Chamberlain | 62/7 |
| 3,486,302 | 12/1969 | Paynter | 62/50.1 |
| 3,699,696 | 10/1972 | Rhoton | 62/45.1 |
| 3,827,246 | 8/1974 | Moen et al. | 62/47.1 |
| 4,218,892 | 8/1980 | Frosch | 62/51.1 |
| 4,412,851 | 11/1983 | Laine | 55/160 |
| 4,821,907 | 4/1989 | Castles et al. | 62/45.1 |

*Primary Examiner*—Ronald C. Capossele
*Attorney, Agent, or Firm*—Lawrence N. Ginsberg; Charles T. Silberberg

[57] ABSTRACT

The fluid management system comprises a mixing-/recirculation system including an external recirculation pump for receiving fluid from a zero gravity storage system and returning an output flow of the fluid to the storage system. An internal axial spray injection system is provided for receiving a portion of the output flow from the recirculation pump. The spray injection system thermally de-stratifies liquid and gaseous cryogenic fluid stored in the storage system.

11 Claims, 3 Drawing Sheets

FLUID MANAGEMENT SYSTEM FOR A ZERO GRAVITY CRYOGENIC STORAGE SYSTEM

STATEMENT OF GOVERNMENT INTEREST

This invention was made with Government support under Contract No. NAS9-14000 awarded by the National Aeronautics and Space Administration (NASA). The Government has certain rights in this invention.

BACKGROUND OF THE INVENTION

1. Field of the Invention

This invention relates generally to cryogenic storage systems and more particularly to a cryogenic fluid management system for zero gravity applications.

2. Description of the Related Art

Long term storage of sub-critical cryogens in space must address the problem of thermal stratification in storage tanks, and associated feed systems. Due to the absence of gravity induced body forces, thermal stratification in zero gravity can be much more severe than commonly experienced in a one G environment. If left uncontrolled, the thermal gradients in zero gravity will result in excessive tank pressure rise and formation of undesirable liquid and vapor mixtures within the liquid bulk, liquid acquisition system, and liquid transfer lines.

Under zero gravity conditions, gases in any storage tank for liquids may occur in any physical location within the interior of the tank, for example, either at the top of the tank, the bottom of the tank, or any intermediate section thereof.

A vehicle adapted to be subjected to the zero gravity operating environment of outer space may include a storage tank for liquids wherein solar heat input will increase the pressure of the tank and gases must be vented from the tank to prevent overpressurization and rupture. A special problem is thus presented in that it is necessary to vent only the gas from the system without loss of all liquid stored in the tank.

State of the art thermodynamic venting system concepts have only addressed issues associated with the tank. Typically, only the liquid bulk has been considered. Ullage, feedline, or zero gravity liquid acquisition devices (screens, capillary channels), have not been included in the total thermal destratification system design. Also, the performance of previous thermodynamic venting concepts has relied on complex analyses to characterize the zero gravity fluid mixing and heat transfer phenomenon.

U.S. Pat. No. 3,105,361, entitled "Zero Gravity Vent System", issued to L. R. Bell, discloses the utilization of a centrifuge to separate the liquid and vapor phases of the fluid withdrawn from a cryogenic storage tank which is subsequently used to generate power to compress the withdrawn two-phase fluid and also to chill the liquid fluid phase across a heat exchanger prior to returning it to the cryogenic storage tank. Pressure reduction in the cryogenic liquid tank in this concept always results in overboard fluid venting losses. The venting loss increases if the fluid straight from cryogenic liquid tank is primarily of liquid phase with the presence of liquid droplets in the overboard discharge flow.

U.S. Pat. No. 4,412,851, entitled "Cryogenic Apparatus Suitable for Operations in Zero Gravity" issued to R. Laine, discloses the utilization of a phase separator inside a storage tank to absorb heat from the bulk fluid through fluid evaporation heat transfer and subsequent fluid venting. The heat transfer rate between the phase separator and the liquid bulk is not enhanced above the zero gravity natural convection heat transfer mode. Consequently venting losses are high due to an inefficient internal tank heat transfer rate.

U.S. Pat. No. 3,693,367, entitled "Thermodynamic Control Device" issued to L. J. DiPeri, discloses the utilization of a surface tension device to establish a gaseous barrier between liquid inside a container and a tank wall. Complete structural isolation of liquid from a containment wall is maintained, thereby minimizing heat transfer. The DiPeri device is designed only to minimize the heat transfer to the liquid and does not address the issues associated with zero gravity venting or fluid management.

U.S. Pat. No. 3,304,729, entitled "Cryogenic Storage System" issued to W. A. Chandler et al, U.S. Pat. No. 3,699,696, entitled "Cryogenic Storage and Expulsion Means", issued to R. L. Rhoton and U.S. Pat. No. 4,821,907, entitled "Surface Tension Confined Liquid Cryogen Cooler", issued to S. H. Castles et al., also address the issues associated with minimizing heat leakage to cryogenic liquid storage systems.

OBJECTS AND SUMMARY OF THE INVENTION

It os a principal object of the present invention to provide a simple and efficient thermodynamic vent system for zero gravity pressure control that can be characterized through one G test without extensive zero gravity flight testing.

It is another object of the present invention to integrate various fluid management functions such as tank chill/fill, zero gravity quantity gauging, feed system thermal conditioning external to the tank and liquid acquisition thermal conditioning located within the tank.

These and other objects are accomplished by the present invention which is a fluid management system for a zero gravity cryogenic storage system. The fluid management system comprises a mixing/recirculation system. The mixing/recirculation system includes an external recirculation pump for receiving fluid from a zero gravity storage system and returning an output flow of the fluid to the storage system. An internal axial spray injection system is provided for receiving a portion of the output flow from the recirculation pump. The spray injection system thermally de-stratifies liquid and gaseous cryogenic fluid stored in the storage system.

The fluid management system preferably includes a heat rejection system which comprises an external vent valve for receiving a second portion of the output flow from the recirculation pump. An external expansion orifice receives an output flow from the vent valve. An internal heat exchanger receives an output flow from the expansion orifice for absorbing heat from the portion of the output flow from the recirculation pump which was directed through the spray injection system. A back pressure orifice vents the heat exchanger output flow to establish a desired pressure level.

A fill line assembly is preferably utilized to provide tank chill and liquid fill without overboard venting. The present invention also provides thermal conditioning of transfer lines, valves and engine/power generation components external the storage tank through liquid recirculation, and liquid acquisition devices internal to the storage tank. It can also be used as a means for determining liquid quantity in a zero gravity space environment.

In contradistinction to U.S. Pat. No. 3,105,361, discussed above, the present invention provides pressure reduction through internal tank fluid mixing and ullage gas condensation resulting from liquid recirculation and liquid spray injection, without overboard venting losses. Tank pressure control can be achieved by thermal destratification without venting for extended storage durations (up to 45 days) by absorbing the heat leakage in the liquid bulk. When heat rejection through venting is desired the overboard discharge flow is always in the superheated gaseous phase with no liquid droplet present, resulting in optimum heat rejection performance.

In contradistinction to U.S. Pat. No. 4,412,851, also discussed above, the heat transfer rate of the present invention is through forced convection. This is several orders of magnitude higher than the zero gravity natural convection heat transfer rate relied upon by the U.S. Pat. No. '851 process. Consequently, the venting durations and venting losses are minimized.

It is also noted that since the active components (i.e. pump, valve) are located external to the storage tank ground check-out and replacement are simplified, resulting in cost and turnaround schedule reductions. Also, no electrical power penetration of the tank is required, which is especially significant for $LO_2$ storage systems in reducing potential ignition hazards.

Other objects, advantages and novel features of the present invention will become apparent from the following detailed description of the invention when considered in conjunction with the accompanying drawings.

BRIEF DESCRIPTION OF THE DRAWINGS

The same elements or parts throughout the figures of the drawings are designated by the same reference characters.

DETAILED DESCRIPTION OF THE PREFERRED EMBODIMENTS

Figure 1:
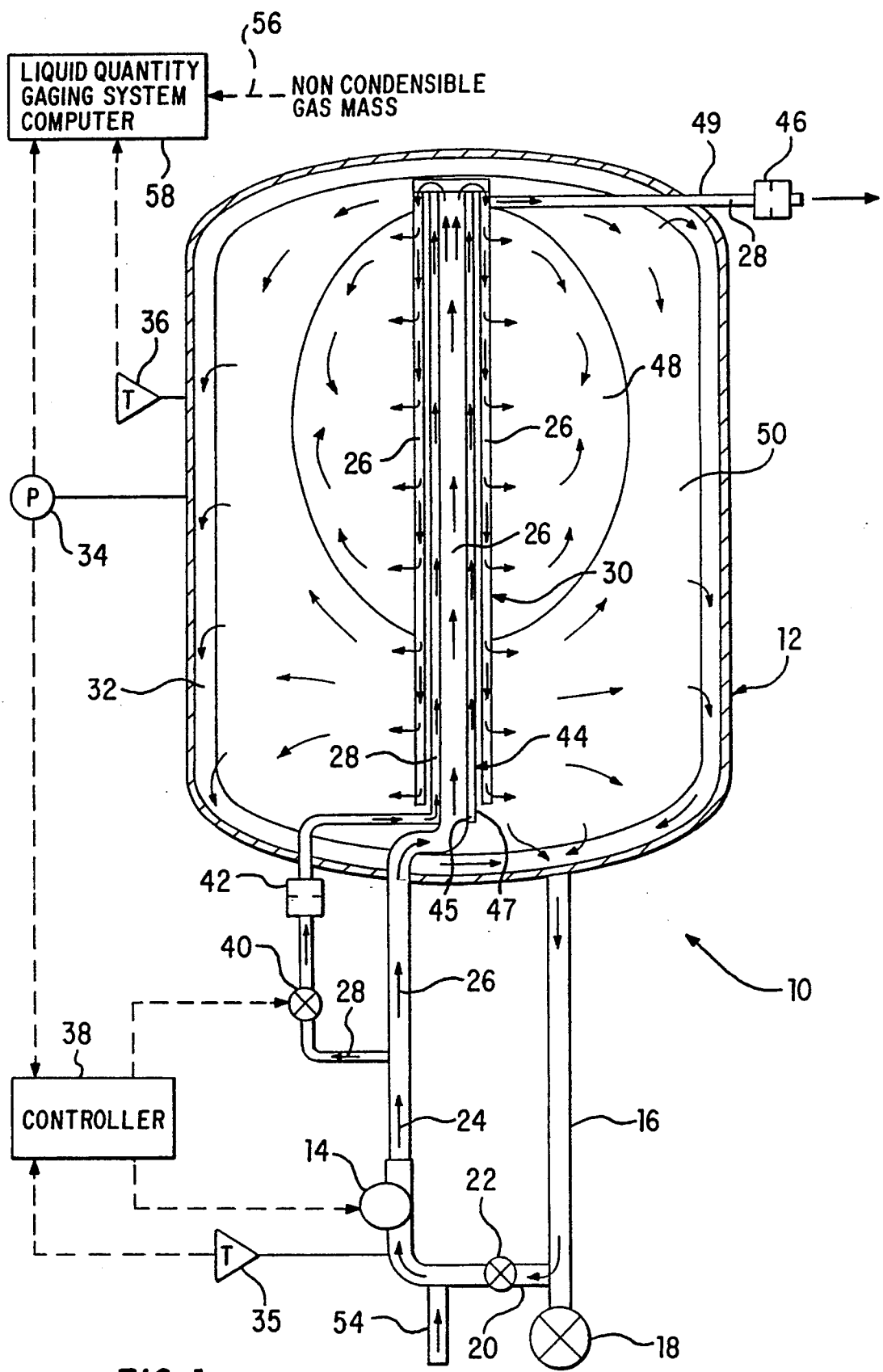
FIG. 1 is a partial cross-sectional view taken through the center of a cryogenic storage system diagramatically illustrating the features of the present invention, said view also showing external system components and connections therefor.

Referring now to the drawings and the characters of reference marked thereon, FIG. 1 illustrates a preferred embodiment of the fluid management system of the present invention, designated generally as 10. Fluid management system 10 is utilized with a zero gravity cryogenic storage system, designated generally as 12. A recirculation pump 14 located external the zero gravity cryogenic storage system 12 receives fluid from the storage system 12 via a main feed line 16. Main feed line 16 is used to provide cryogenic fluid to the cryogenic system main shut off valve 18. Shut off valve 18 may be, for example, a pre-valve for an engine, a main engine valve, or a power generation isolation valve.

A recirculation pump inlet line 20 is located in close proximity to the main shut off valve 18 in order to thermally condition the main feed line 16 up to the main shut off valve 18. A chill/fill valve 22 (which will be discussed in detail below) is normally open to allow flow from the storage system 12 to the recirculation pump 14 inlet. The recirculation pump output flow 24 is divided into a first portion 26 and a second portion 28. The first portion or spray injection flow 26 is introduced to an internal axial spray injection system, designated generally as 30.

The cryogenic storage system 12 comprises a storage tank which is used to store subcritical cryogenic fluid. The storage tank 12 may be, for example, spherical or cylindrical. It is formed of a suitable material used to store cryogens. It includes a suitable thermal protection system typically comprising a foam, multi-layered insulation or vacuum jacketed insulation. The storage system 12 may also contain a liquid acquisition system 32 for zero gravity fluid control, as will be discussed in more detail below.

Storage system 12 also includes appropriate pressure and temperature instrumentation, designated as 34 and 36, respectively, to monitor storage tank pressure and fluid temperature. These measurements are input to a controller 38 to activate the recirculation pump 14 and a vent valve 40, as explained below.

The recirculation pump 14 preferably comprises a centrifugal axial flow pump which is electrically driven by alternating current or direct current. Alternate driving means may include a gas turbine. The recirculation pump may alternatively be a positive displacement pump, which is electrically or pneumatically driven.

The internal axial spray injection system 30 is designed to thermally de-stratify liquid and gaseous cryogenic fluids stored in the storage system through forced convection mixing. It preferably comprises an axially positioned spray bar system with a plurality of equally spaced orifices resulting in a uniform spray injection flow rate.

The vent flow 28 is utilized to reject heat from the storage system 12. The flow 28 is directed through the external vent valve 40 and through a flow control external expansion orifice 42. The flow is then directed through an internal heat exchanger 44. Heat exchanger 44 is preferably a parallel flow heat exchanger of concentric tube design with the vent flow 28 flowing through a passage between an inner tube 45 and an outer concentric tube 47, with the inner tube 45 containing the spray injection flow 26. The vent flow 28 is collected by a vent tube 49 and is discharged overboard via a back pressure orifice 46. The back pressure orifice 46 is provided for establishing a desired heat exchanger pressure level. Spray injection flow 26 is manifolded at the top (outlet) of the heat exchanger 44 and is directed to spray injection tubes of the spray injection system 30. An alternate heat exchanger design could comprise the vent flow 28 wrapped around the spray injection system 30 in a spiral-type heat exchanger configuration.

In operation, when the tank pressure, sensed by the pressure transducer 34, reaches the maximum desired level pre-set in the controller 38, the controller 38 activates the recirculation pump 14 by sending an electrical current to power the recirculation pump 14. The pump 14 draws liquid from the storage tank 12 through the use of the liquid acquisition system 32 and injects it into the stratified ullage gas, designated by numeral 48. (The liquid in FIG. 1 is designated by numeral designation 50.)

The forced convection heat transfer established between the liquid spray injection flow and the ullage gas 48 results in ullage gas chill down and pressure decay. The heat in the ullage gas 48 is transferred into the liquid bulk 50 through continuous liquid spray injection and bulk mixing. When the pressure level, sensed by the pressure transducer 34, reaches the lower limit defined in the controller 38, the electrical power to the recirculation pump 14 is terminated. Initially, pressure control is achieved through liquid spray injection mixing without any venting losses. This mode of operation continues until the liquid bulk temperature, as indicated by the temperature sensor 36, reaches a maximum desired level established in the controller 38. To prevent further rise in liquid bulk temperature, heat must be rejected from the storage system 12. This is accomplished by the opening of the vent valve 40 located downstream of the recirculation pump 14.

Figure 2:
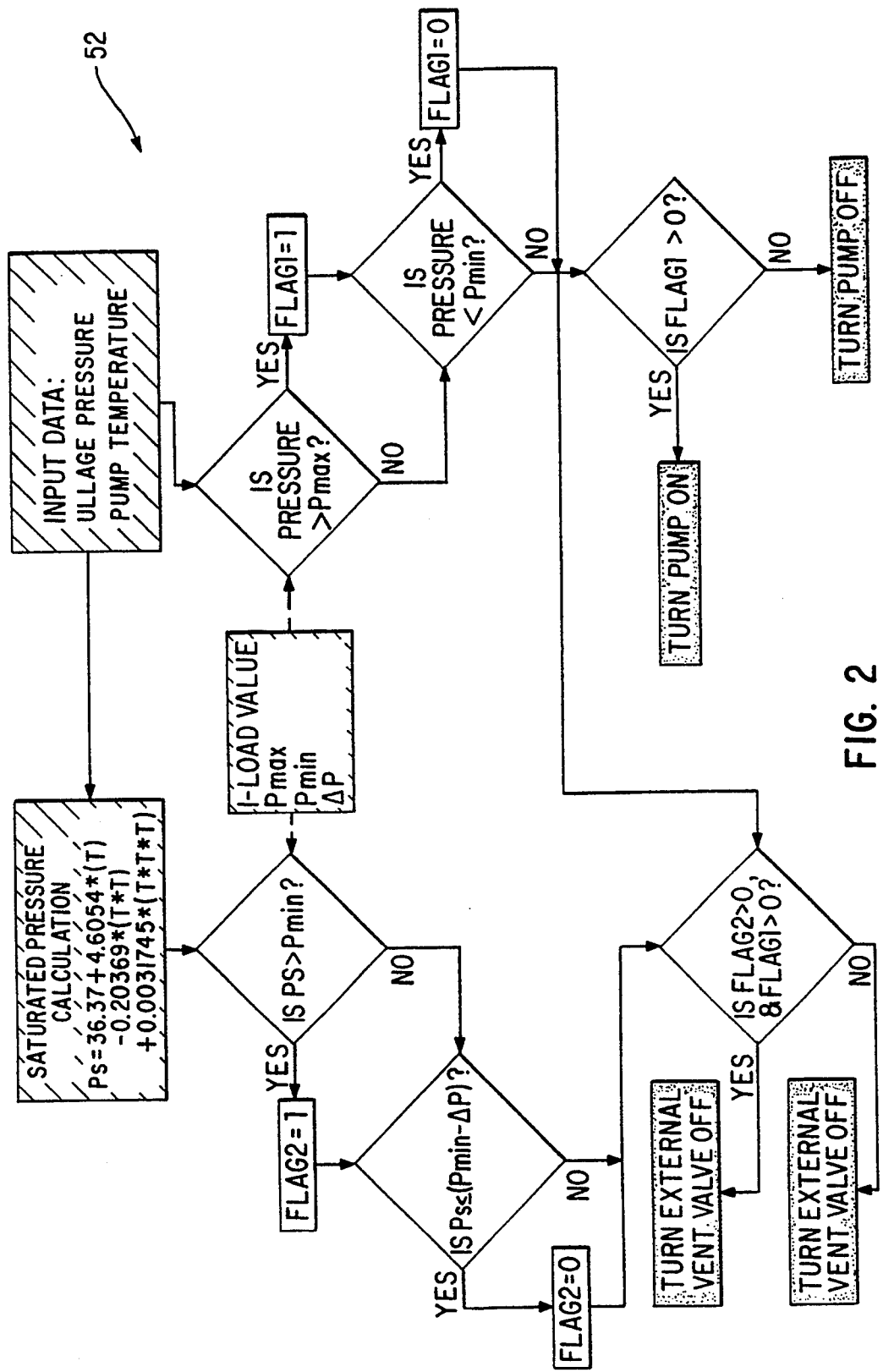
FIG. 2 illustrates the controller logic of the present invention.

Referring now to FIG. 2, the control logic is illustrated, designated generally as 52. The controller allows separate control of the recirculation pump 14 and external vent valve 40. The input parameters include storage tank pressure 34 and recirculation pump inlet temperature 35, input load values $P_{max}$, $P_{min}$, and $\Delta P$. The temperature measurement is converted to a liquid saturated pressure ($P_s$) through a third order equation, and is compared to the tank pressure level 34 to determine the desired liquid subcooling. The external vent valve 40 can only be activated if the recirculation pump 14 is activated. The control logic 52 only opens the vent valve 40 if the recirculation pump 14 is ON and the temperature is greater than the maximum allowable level pre-set in the controller 38. Opening of the vent valve allows a small flow rate, controlled by the orifice 42 downstream of the vent valve 40, to enter the heat exchanger 44. Since the vent flow expands to a low pressure, the fluid entering the heat exchanger 44 flashes to liquid and gas at a lower temperature. The temperature sink is predetermined by the restriction in the back pressure orifice 46. Because the recirculation pump 14 is also ON when the vent valve 40 is open, the overboard vent flow absorbs heat from the liquid spray injection flow. The design of the heat exchanger 44 is such that the vent flow is completely vaporized to a gas and is rejected to vacuum as a super heated gas approaching the liquid spray injection temperature. In this way, the heat capacity of the vent flow is increased above the normal heat of evaporation value since it also includes a degree of vapor super heating.

Figure 3:
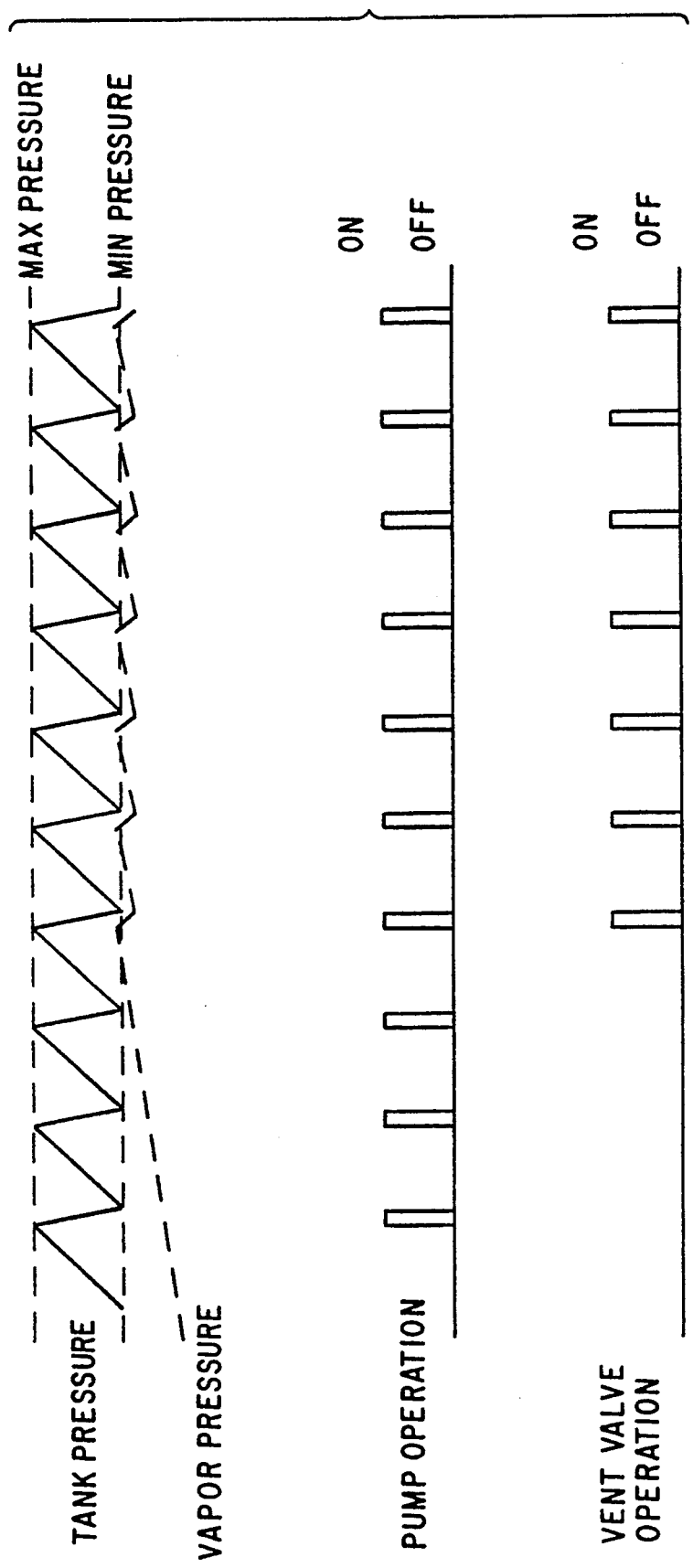
FIG. 3 is a chart illustrating how the controller activates the recirculation pump and vent valve to maintain tank pressure and liquid vapor pressure.

Referring now to FIG. 3, the pump and vent valve operations are shown for a typical tank pressure control band. Initially, tank pressure collapse through spray injection is sufficient through the activation of the recirculation pump 14, without heat rejection through overboard venting. When a liquid temperature at the recirculation pump reaches the maximum desired level, the vent valve is activated in conjunction with the recirculation pump operation to reject heat and control tank pressure through overboard venting. This minimizes the net loss of cryogens during idle mode tank pressure control.

Referring again now to FIG. 1, the fluid management system 10 preferably includes a fill line assembly comprising a fill line 54 and the chill/fill valve 22. The fill line 54 receives cryogenic filling fluid from an external cryogenic re-supply source (not shown) and provides the filling fluid to the recirculation pump 14. The chill/fill valve 22 is so positioned to operate in a closed position to prevent the cryogenic filling fluid from being introduced directly to the zero gravity storage system 12, thereby preventing the bypassing of the spray injection system 30 so as to thermally chill the zero gravity storage system 12. When the storage tank has been sufficiently chilled, the chill/fill valve is opened to allow simultaneous introduction of the filling fluid to the recirculation pump 14 and direct filling of the storage system through the main feedline 16 and liquid acquisition system 32. This procedure insures that the liquid acquisition system is filled with liquid and flushed free of vapor bubbles. This accomplishes a no vent fill with continuous ullage gas condensation through use of ullage gas spray injection. If liquid bulk thermal conditioning is required, it can be accomplished through the opening of the vent valve 40 and subsequent heat rejection.

Still referring to FIG. 1, it can be seen that the present invention can be used to calculate the cryogenic liquid quantity in a zero gravity environment by using the measured tank pressure 34 and fluid temperature 36 in conjunction with a known non-condensible gas quantity. Because the liquid and gas can be thermally de-stratified through spray injection mixing to accomplish a uniform temperature in both the ullage gas and liquid bulk, a simple pressure-volume-temperature (P-V-T) calculation can be performed to estimate the volume occupied by the known quantity of non-condensible gas, which is an input valve 56 to a computational system 58. From the ullage volume, the liquid volume and liquid mass can be calculated. This approach is valid for either a single large bubble or a multitude of small bubbles. This invention greatly simplifies alternate means of defining subcritical cryogenic fluid quantities such propellant settling thrust maneuvers, or complex radio isotope gauging systems.

In order to prevent loss of the non-condensible pressure during tank venting operations, a liquid acquisition system 32 is required with the zero gravity quantity gauging system. The liquid acquisition system 32 comprises a screen located adjacent the inner surface of the storage tank for providing liquid retention through surface tension effects.

Obviously, many modifications and variations of the present invention are possible in light of the above teachings. It is, therefore, to be understood that within the scope of the appended claims, the invention may be practiced otherwise than as specifically described.

What is claimed and desired to be secured by Letters Patent of the United States is:

1. A fluid management system for a zero gravity cryogenic storage system, comprising:
   a mixing/recirculation system, comprising:
   a) an external recirculation pump for receiving fluid from a zero gravity storage system and returning an output flow of said fluid to said storage system;
   b) an internal axial spray injection system for receiving a portion of said output flow from said recirculation pump, said spray injection system for thermally de-stratifying liquid and gaseous cryogenic fluid stored in said storage system; and,
   a heat rejection system, comprising:
   a) an external vent valve for receiving a second portion of said output flow from said recirculation pump;

b) an external expansion orifice for receiving an output flow from said vent valve;

c) an internal heat exchanger for receiving an output flow from said expansion orifice for absorbing heat from said portion of the output flow from said recirculation pump which was directed through said spray injection system, said heat exchanger having an output flow; and, d) a back pressure orifice for establishing a desired heat exchanger pressure level.

2. The fluid management system of claim 1, wherein said mixing/recirculation system comprises a controller for initiating and terminating recirculation pump operation at a desired storage system fluid pressure range without activating said heat rejection system, thereby accomplishing pressure control without storage system fluid venting losses.

3. The fluid management system of claim 2, wherein said controller includes means for initiating and terminating said control valve operation in a desired storage system fluid temperature range so as to control fluid bulk temperature by heat rejection through overboard venting.

4. The fluid management system of claim 1 wherein said internal axial spray injection system comprises an axially positioned spray bar system with a plurality of equally spaced orifices.

5. The fluid management system of claim 4 wherein said internal heat exchanger comprises a parallel flow concentric heat exchanger.

6. A fluid management system for a zero gravity cryogenic storage system, comprising:

a mixing/recirculation system, comprising:

a) an external recirculation pump for receiving fluid from a zero gravity storage system and returning an output flow of said fluid to said storage system;

b) an internal axial spray injection system for receiving a portion of said output flow from said recirculation pump, said spray injection system for thermally de-stratifying liquid and gaseous cryogenic fluid stored in said storage system; and a fill line assembly, said fill line assembly comprising:

a fill line for receiving cryogenic filling fluid from an external cryogenic re-supply source and providing said filling fluid to said recirculation pump; and, a chill/fill valve so positioned to operate in a closed position to prevent said cryogenic filling fluid from being introduced directly to said zero gravity storage system and preventing the bypassing of said spray injection system so as to thermally chill said zero gravity storage system, said chill/fill valve being operable in a normally open position to allow simultaneous introduction of said filling fluid to said recirculation pump and direct filling of said storage system, thereby accomplishing no vent fill with continuous ullage gas condensation through use of said spray injection system.

7. A fluid management system for a zero gravity cryogenic storage system, comprising:

a mixing/recirculation system, comprising:

a) an external recirculation pump for receiving fluid from a zero gravity storage system and returning an output flow of said fluid to said storage system;

b) an internal axial spray injection system for receiving a portion of said output flow from said recirculation pump, said spray injection system for thermally de-stratifying liquid and gaseous cryogenic fluid stored in said storage system; and means for calculating the cryogenic liquid quantity of fluid in said zero gravity storage system based on a known quantity of non-condensible gas in said storage system and measure values of pressure and fluid temperature in said storage system.

8. A zero gravity cryogenic storage and transfer system, comprising:

a) a storage tank;

b) a zero gravity liquid acquisition system comprising screen means located adjacent an inner surface of said storage tank for providing surface tension effects; and c) a fluid management system, comprising a mixing/recirculation system, comprising:

i) an external recirculation pump for receiving fluid from said storage tank;

ii) an internal axial spray injection system for receiving a portion of an output flow from said recirculation pump, said spray injection system for thermally destratifying liquid and gaseous cryogenic fluid stored in said storage tank; and a heat rejection system, comprising:

a) an external vent valve for receiving a second portion of said output flow from said recirculation pump;

b) an external expansion orifice for receiving an output flow from said vent valve;

c) an internal heat exchanger for receiving an output flow from said expansion orifice for absorbing heat from said portion of the output flow from said recirculation pump which was directed through said spray injection system, said heat exchanger having an output flow; and, d) a back pressure orifice for establishing a desired heat exchanger pressure level.

9. The zero gravity cryogenic storage and transfer system of claim 8, wherein said mixing/recirculation system comprises a controller for initiating and terminating recirculation pump operation at a desired storage system fluid pressure range without activating said heat rejection system, thereby accomplishing pressure control without storage system fluid venting losses.

10. The zero gravity cryogenic storage and transfer system of claim 9 wherein said controller includes means for initiating and terminating said control valve operation in a desired storage system fluid temperature range so as to control fluid bulk temperature by heat rejection through overboard venting.

11. The zero gravity cryogenic storage and transfer system of claim 10, further comprising a fill line assembly, said fill line assembly comprising:

a fill line for receiving cryogenic filling fluid from an external cryogenic re-supply source and providing said filling fluid to said recirculation pump; and, a chill/fill valve so positioned to operate in a closed position to prevent said cryogenic filling fluid from being introduced directly to said zero gravity storage system and preventing the bypassing of said spray injection system so as to thermally chill said zero gravity storage system, said chill/fill valve being operable in a normally open position to allow simultaneous introduction of said filling fluid to said recirculation pump and direct filling of said storage system, thereby accomplishing no vent fill with continuous ullage gas condensation through use of said spray injection system.

* * * * *